US011417055B1

(12) United States Patent
Clemens et al.

(10) Patent No.: US 11,417,055 B1
(45) Date of Patent: Aug. 16, 2022

(54) INTEGRATED DISPLAY RENDERING

(71) Applicant: Tanzle, Inc., Scotts Valley, CA (US)

(72) Inventors: Nancy L. Clemens, Scotts Valley, CA (US); Michael A. Vesely, Scotts Valley, CA (US)

(73) Assignee: Tanzle, Inc., Scotts Valley, CA (US)

( * ) Notice: Subject to any disclaimer, the term of this patent is extended or adjusted under 35 U.S.C. 154(b) by 0 days.

(21) Appl. No.: 17/319,586

(22) Filed: May 13, 2021

Related U.S. Application Data

(60) Provisional application No. 63/024,410, filed on May 13, 2020.

(51) Int. Cl.
*G06T 15/50* (2011.01)
*G06T 7/73* (2017.01)
*G06T 15/20* (2011.01)
*G06T 3/00* (2006.01)

(52) U.S. Cl.
CPC .......... *G06T 15/205* (2013.01); *G06T 3/0031* (2013.01); *G06T 7/73* (2017.01); *G06T 15/50* (2013.01); *G06T 2207/10021* (2013.01)

(58) Field of Classification Search
CPC ....... G06T 15/205; G06T 3/0031; G06T 7/73; G06T 15/50; G06T 2207/10021
See application file for complete search history.

(56) References Cited

U.S. PATENT DOCUMENTS 9,266,017 B1 2/2016 Parker et al.
2005/0176502 A1* 8/2005 Nishimura ............ A63F 13/537 463/31
2010/0328306 A1* 12/2010 Chau ..................... G06F 3/0418 345/173
2011/0107270 A1* 5/2011 Wang ..................... G16H 20/40 703/11
2012/0113105 A1* 5/2012 Lee ........................ G09G 3/003 345/419
2013/0033511 A1* 2/2013 Baioura .................. G09G 5/14 345/545
2013/0182225 A1 7/2013 Stout
(Continued)

OTHER PUBLICATIONS

Lu et al., *A Survey of Motion-Parallax-Based 3-D Reconstruction Algorithms*, IEEE Transactions on Systems, Man, and Cybernetics—Part C: Applications and Review, 2004, 34(4):532-548.

*Primary Examiner* — Jitesh Patel
(74) *Attorney, Agent, or Firm* — Fish & Richardson P.C.

(57) ABSTRACT

A system, method or compute program product for integrating two or more displays. One of the systems includes a stereoscopic first display; a monoscopic second display; and one or more computers configured to perform operations including receiving first data representing a 3D scene including at least one virtual 3D object, receiving second data related to the at least one virtual 3D object, obtaining third data representing the position and/or orientation of the second display relative to position and/or orientation of the first display, based on the first data, rendering the 3D scene including the at least one virtual object as a stereoscopic image on the stereoscopic first display, and based on the second data, rendering a 2D object on the monoscopic second display with the rendering varying based on the position and orientation of the second display relative to the first display provided by the third data.

20 Claims, 10 Drawing Sheets

(56) References Cited

U.S. PATENT DOCUMENTS

| | | | | |
|---|---|---|---|---|
| 2014/0015942 | A1* | 1/2014 | Said | G02B 30/27<br>348/59 |
| 2014/0118506 | A1 | 5/2014 | Uhl | |
| 2014/0306995 | A1 | 10/2014 | Raheman et al. | |
| 2015/0054823 | A1 | 2/2015 | Dzhurinskiy et al. | |
| 2015/0348326 | A1 | 12/2015 | Sanders et al. | |
| 2018/0035104 | A1* | 2/2018 | Nielsen | H04N 13/128 |
| 2018/0205940 | A1 | 7/2018 | Donovan | |
| 2019/0102949 | A1 | 4/2019 | Sheftel et al. | |
| 2019/0340964 | A1* | 11/2019 | Kwon | G06F 1/1641 |
| 2021/0067760 | A1* | 3/2021 | Yang | H04N 21/482 |

* cited by examiner

INTEGRATED DISPLAY RENDERING

CROSS-REFERENCE FOR RELATED APPLICATION

This patent document claims the priority of U.S. Provisional Application No. 63/024,410, filed on May 13, 2020. The above referenced application is incorporated by reference as part of the disclosure of this document.

BACKGROUND

Technical Field

This disclosure relates to a display system, and in particular, to a display system that integrates stereoscopic and monoscopic images.

Description of Related Art

Three dimensional (3D) capable electronics and computing hardware devices and real-time computer-generated 3D computer graphics have been a popular area of computer science for the past few decades, with innovations in visual, audio, tactile and biofeedback systems. Much of the research in this area has produced hardware and software products that are specifically designed to generate greater realism and more natural computer-human interfaces.

These innovations have significantly enhanced and simplified the end-user's computing experience.

Ever since humans began to communicate through pictures, they faced a dilemma of how to accurately represent the three-dimensional world they lived in. Sculpture was used to successfully depict three-dimensional objects, but was not adequate to communicate spatial relationships between objects and within environments. To do this, early humans attempted to "flatten" what they saw around them onto two-dimensional, vertical planes (e.g., paintings, drawings, tapestries, etc.).

The two dimensional pictures must provide a numbers of cues of the third dimension to the brain to create the illusion of three dimensional images. This effect of third dimension cues can be realistically achievable due to the fact that the brain is quite accustomed to it. The three dimensional real world is always and already converted into two dimensional (e.g., height and width) projected image at the retina, a concave surface at the back of the eye. And from this two dimensional image, the brain, through experience and perception, generates the depth information to form the three dimension visual image from two types of depth cues: monocular (one eye perception) and binocular (two eye perception). In general, binocular depth cues are innate and biological while monocular depth cues are learned and environmental.

A planar stereoscopic display, e.g., a LCD-based or a projection-based display, shows two images with disparity between them on the same planar surface. By temporal and/or spatial multiplexing the stereoscopic images, the display results in the left eye seeing one of the stereoscopic images and the right eye seeing the other one of the stereoscopic images. It is the disparity of the two images that results in viewers feeling that they are viewing three dimensional scenes with depth information.

SUMMARY

In one aspect, a hybrid display system includes a stereoscopic first display, a monoscopic second display, and one or more computers. The computer are configured to perform operations including receiving first data representing a 3D scene including at least one virtual 3D object, receiving second data related to the at least one virtual 3D object, obtaining third data representing the position and/or orientation of the second display relative to position and/or orientation of the first display, based on the first data rendering the 3D scene including the at least one virtual object as a stereoscopic image on the stereoscopic first display, and based on the second data rendering a 2D object on the monoscopic second display with the rendering varying based on the position and orientation of the second display relative to the first display provided by the third data.

Implementations may include one or more of the following features.

The system further includes one or more sensors to track a position and/or orientation of the second display rendering relative to the first display, and the operations further include receiving a signal from the one or more sensors representing the position and/or orientation of the second display rendering relative to position and/or orientation of the first display.

Rendering the 2D object includes determining a position on the second display to display the 2D object based on the position and/or orientation of the second display relative to the first display. Rendering the 2D object includes determining a position on the second display to display the 2D object based on the position and/or orientation of the virtual object within the stereoscopic image.

Rendering the 2D object includes determining a modification of the 2D object based on the position and orientation of the second display relative to the first display. Determining a modification of the 2D object includes one or more of adding color, bolding, shadowing or highlighting.

Rendering the 2D object includes rendering a connection object with the rendering including a joining object on the virtual 3D object displayed on the first display and the 2D object displayed on the second display, where the joining object rendering is a dual view projection rendering on the first display and the joining object rendering is a mono view projection rendering on the first display. Rendering the connection comprises rendering the connection on both the first display and the second display.

The operations further include receiving a selection of the 3D object and in response to receiving the selection rendering the 2D object. The second data is text and the 2D object is a text box. The second data is a monoscopic rendered image and the 2D object is a 2D rendered image. Rendering the 3D scene include rendering the virtual object overlaid on virtual environment.

The stereoscopic display comprises a time sequential stereo display. The system further includes polarization glasses or shutter glasses.

In another aspect, a hybrid display system includes a stereoscopic first display, a monoscopic second display, and one or more computers. The computers are configured to perform operations including receiving first data representing a 3D scene including at least one virtual 3D object, receiving second data related to the at least one virtual 3D object, based on the first data rendering the 3D scene including the at least one virtual object as a stereoscopic image on the stereoscopic first display, and based on the second data rendering a 2D object on the monoscopic second display with the rendering of the 2D object varying based on a position and orientation of the at least one virtual 3D object within the first display.

Implementations may include one or more of the following features.

The system further includes one or more sensors to track a position and/or orientation of the second display rendering relative to the first display, and the operations further comprise receiving a signal from the one or more sensors representing the position and/or orientation of the second display rendering relative to position and/or orientation of the first display. Rendering the 2D object includes determining a position on the second display to display the 2D object based on the position and/or orientation of the second display relative to the first display. Rendering the 2D object includes determining a position on the second display to display the 2D object based on the position and/or orientation of the at least one virtual 3D object within the stereoscopic image.

Rendering the 2D object includes determining a modification of the 2D object based on the position and orientation of the second display relative to the first display. Rendering the 2D object includes determining a modification of the 2D object based on the position and orientation of the at least one virtual 3D object within the first display. Determining a modification of the 2D object includes one or more of adding color, bolding, shadowing or highlighting.

Rendering the 2D object includes rendering a connection object with the rendering including a joining object on the at least one virtual 3D objects displayed on the first display and the 2D object displayed on the second display, where the joining object rendering is a dual view projection rendering on the first display and the joining object rendering is a mono view projection rendering on the first display. Rendering the connection comprises rendering the connection on both the first display and the second display.

The operations further include receiving a selection of the at least one virtual 3D objects and in response to receiving the selection rendering the 2D object. The second data is text and the 2D object is a text box. The second data is a monoscopic rendered image and the 2D object is a 2D rendered image. Rendering the 3D scene include rendering the at least one virtual 3D objects overlaid on virtual environment.

The stereoscopic display comprises a time sequential stereo display. The system further includes polarization glasses or shutter glasses.

In another aspect, a hybrid display system includes a stereoscopic first display, a monoscopic second display, and one or more computers. The computers are configured to perform operations including receiving first data representing a 3D scene including at least one virtual 3D object, receiving second data related to the at least one virtual 3D object, based on the first data rendering the 3D scene including the at least one virtual object as a stereoscopic image on the stereoscopic first display based on the second data rendering a 2D object on the monoscopic second display, and rendering a connection between the virtual 3D object and the 2D object on the first display and/or the second display.

Implementations may include one or more of the following features.

Rendering the connection comprises rendering the connection on both the first display and the second display. Rendering the connection including varying the rendering based on a position and orientation of the at least one virtual 3D object within the first display and/or a position and orientation of the first display relative to the second display. The connection is a line extending from one of the 2D object or 3D object toward the other of the 2D object or 3D object.

In another aspect, a hybrid display system includes a stereoscopic first display, a monoscopic second display, a pointer device, one or more sensors to track a position and orientation of the pointer device relative to the first display and the second display, and one or more computers. The computer are configured to perform operations including receiving first data representing at least one virtual 3D object, receiving second data representing at least one 2D object, receiving a signal from the one or more sensors representing the position and orientation of the pointer device relative to the first display and the second display, selecting one of the first display and second display based on the position and orientation of the pointer device relative to the first display and the second display, rendering an indication of the pointing device on the selected one of the first display and second display.

Implementations may include one or more of the following features.

Selecting one of the first display and second display comprises determining a position of the pointing device relative to a virtual position of the least one 3D object. Selecting one of the first display and second display comprises determining whether the pointing device is closer to the second display or to the virtual position of the at least one 3D object. Selecting one of the first display and second display comprises determining an intersection of a line projected from the pointing device that depends on an orientation of the pointing device with one of the displays. Rendering the indication of the pointing device includes rendering a ray emerging from the pointer toward the first display. Rendering the indication of the pointing device includes rendering a pointer icon at a location within the virtual scene displayed by the second display corresponding to a location of pointer device. Rendering the indication of the pointing device includes rendering a pointer icon at a location on the second display pointed to by the pointer device.

In other aspects, methods including the operations of the systems described above. In other aspects, a computer program product configured to perform the operations of the systems described above.

Potential advantages include one or more of the following. A stereoscopic display and a monoscopic display may be used in conjunction; for some applications this may be lower cost than a large stereoscopic display. A common pointer device can be used for both the stereoscopic display and the monoscopic display. In addition, in either case, a more intuitive display environment may be created.

BRIEF DESCRIPTION OF THE DRAWINGS

A better understanding of the present disclosure can be obtained when the following detailed description of the preferred embodiment is considered in conjunction with the following drawings, in which.

DETAILED DESCRIPTION

Figure 1:
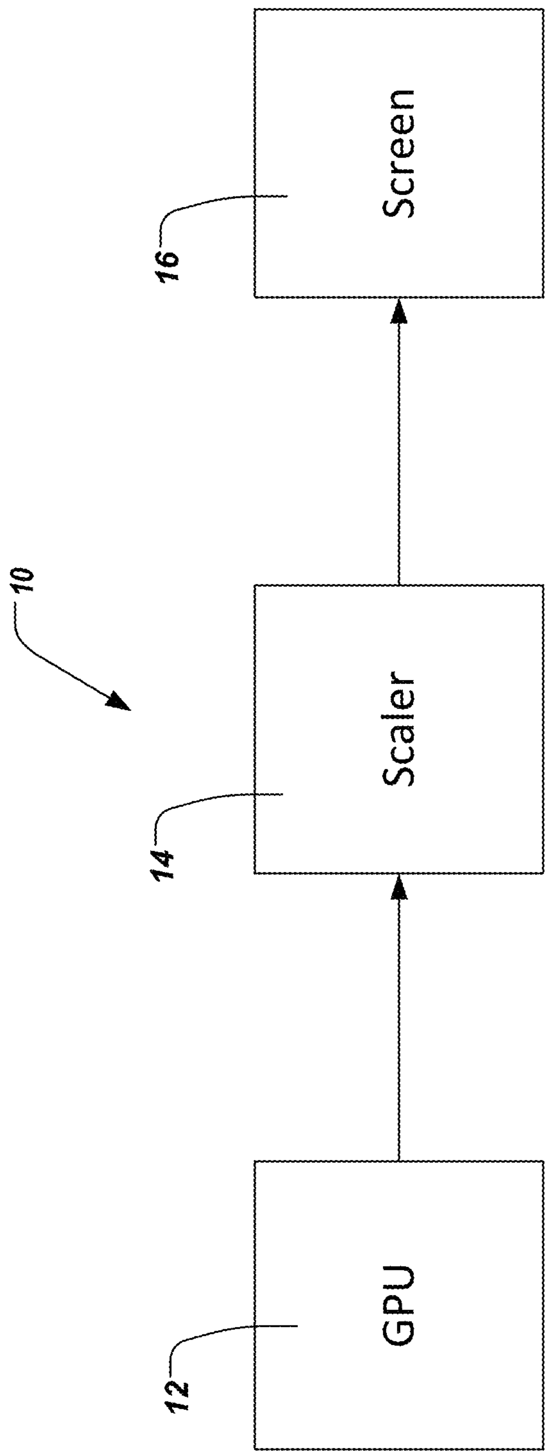
FIG. 1 presents a prior art display chain.

FIG. 1 illustrates a typical conventional display chain 10, which includes the following components:

1. Graphics Processing Unit (GPU). The GPU 12 typically resides on a personal computer, workstation, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

2. Scaler. The scaler 14 is a video processor that converts video signals from one display resolution to another. This component takes as input the video levels (e.g., for R, G, and B) for each pixel output from the GPU, and processes them in various ways, before outputting (usually) modified video levels for RGB in a format suitable for the panel, usually in the same 8-bit range of 0-255. The conversion can be a scaling transformation, but can also possibly include a rotation or other linear or non-linear transformation. The transformation can also be based on a bias of some statistical or other influence. The scaler 14 can be a component of a graphics card in the personal computer, workstation, etc.

3. Panel. The panel 16 is the display screen itself. In some implementations, the panel 16 can be a liquid crystal display (LCD) screen. In some other implementations, the panel 16 can be a component of eyewear that a user can wear. Other display screens are possible.

Time Sequential Stereo Displays

Unlike a normal display, in a stereo display, there are two images—right and left. The right image is to be delivered to only the right eye, and the left image is to be delivered to only the left eye. In a time sequential stereo display, this separation of right and left images is performed in time, and thus, it must contain some time-dependent element which separates these two images. There are two common architectures.

Figure 2:
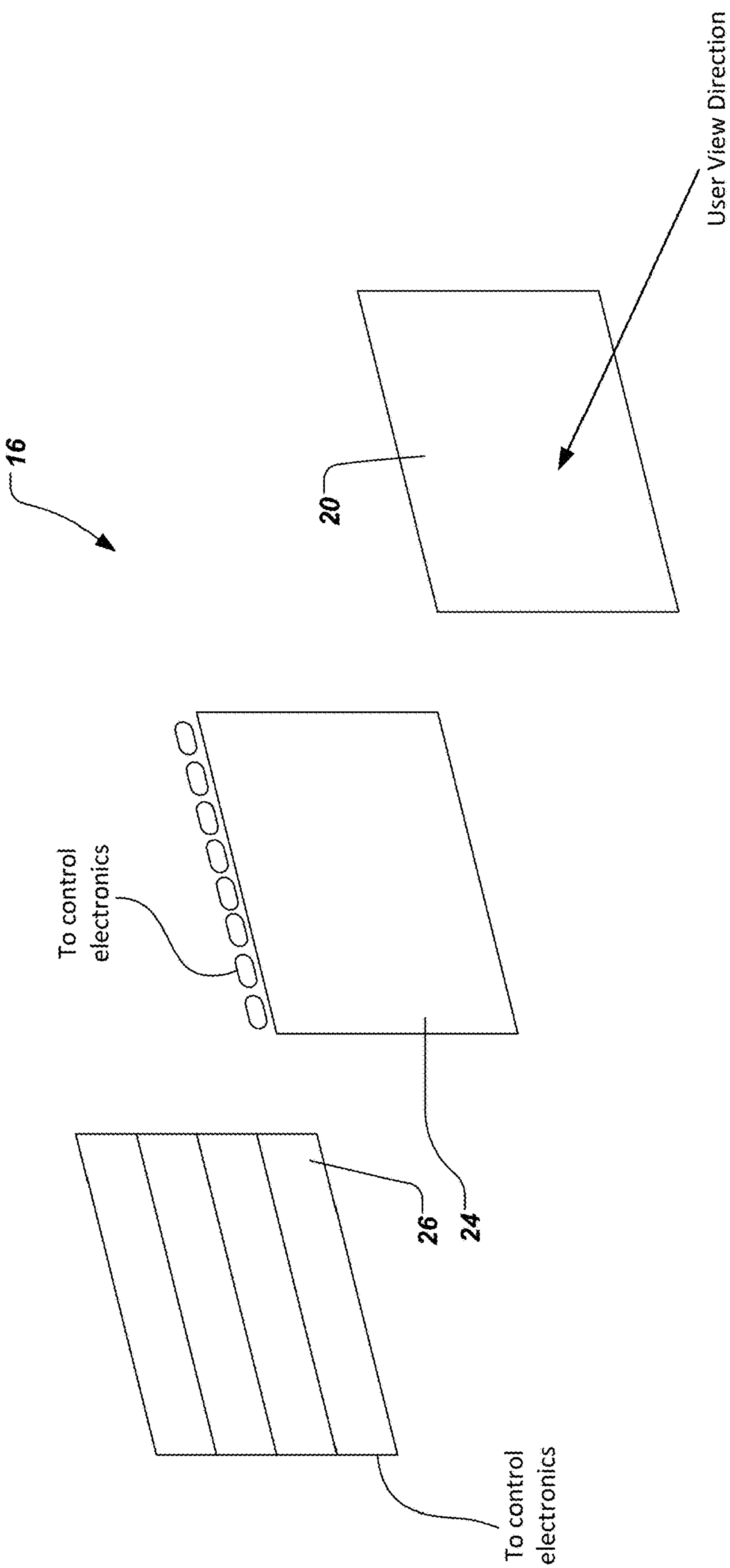
FIG. 2 presents a prior art polarization switch architecture.

The first architecture, shown in FIG. 2, uses a device called a polarization switch (PS) 20 which may be a distinct (separate) or integrated LC device or other technology switch. The polarization switch 20 is placed in front of the display panel 24, specifically between the display panel 24 and the viewer. The display panel 24 can be an LCD panel which can be backlit by a backlight unit 26, or any other type of imaging panel, e.g., an organic light emitting diode (OLED) panel, a plasma display, etc., or any other pixelated panel display used in a time-sequential stereo imaging system. The purpose of the polarization switch 20 is to switch the light between two orthogonal polarization states. For example, one of these states may be horizontally linearly polarized light (horizontal linear polarization state), and the other may be vertically linearly polarized light (vertical linear polarization state); however, other options are possible, e.g., left and right circular polarization states, etc., the key feature being that the two polarization states are orthogonal.

Figure 3:
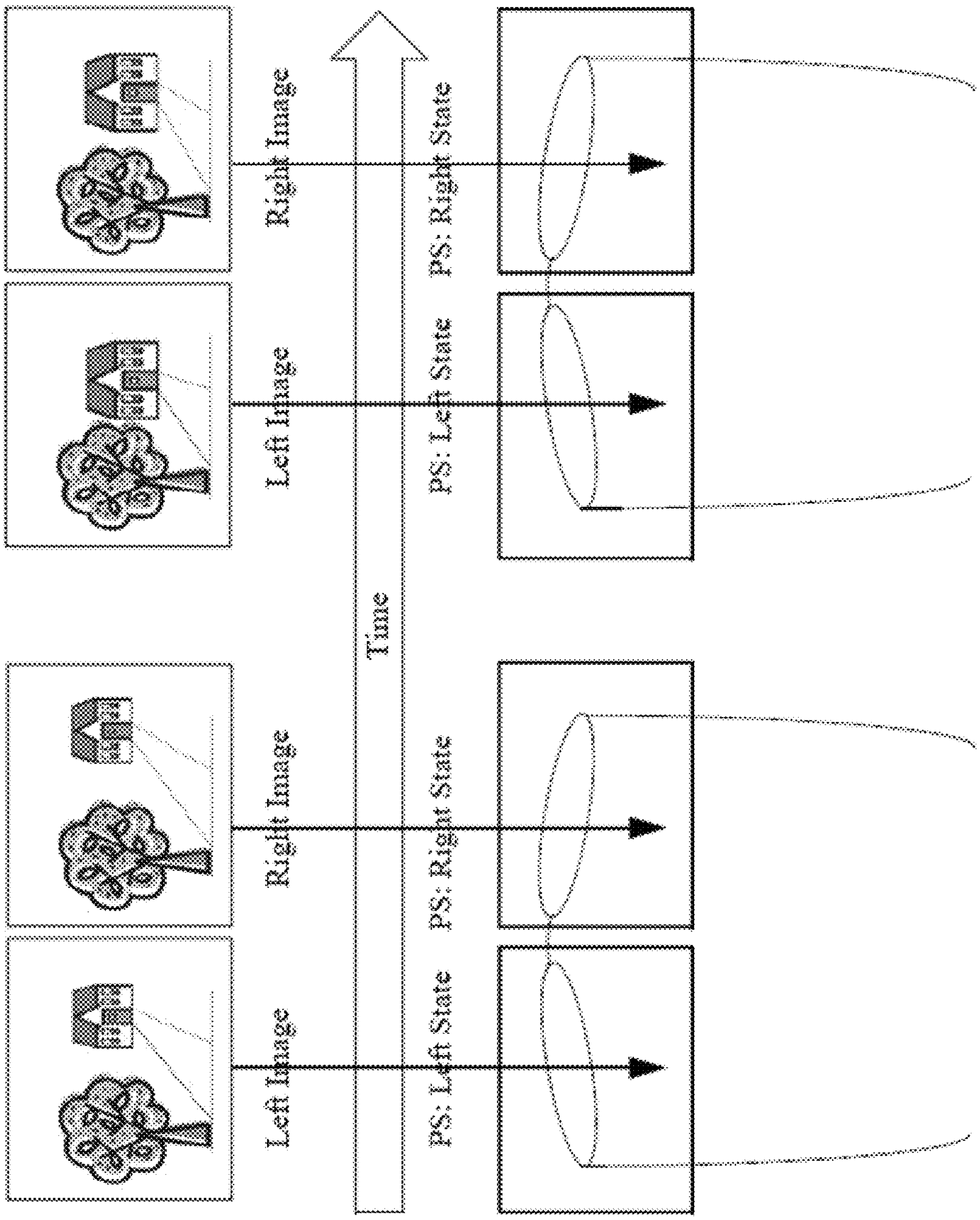
FIG. 3 presents prior art left and right switching views causing a stereo 3D effect.

This allows achievement of the stereo effect shown in FIG. 3. As may be seen, the top portion of the figure shows the (display) panel switching between a left image and a right image. Synchronous with this, the PS is switching between a Left State and a Right State. These states emit two orthogonal polarization states, as mentioned above. The stereo eyewear is designed such that the left lens will only pass the Left State polarization and the right lens will only pass the Right State polarization. In this way, separation of the right and left images is achieved.

The second conventional architecture uses stereo shutter glasses, which replace the PS and eyewear. In this system, each eye is covered by an optical shutter, which can be either open or closed. Each of these shutters is opened and closed synchronously with the panel display in such a way that when the left image is shown on the display, only the left eye shutter is open, and when the right image is shown on the display, only the right eye shutter is open. In this manner, the left and right views are presented to the user's left and right eyes, respectively.

Terms

The following is a list of terms used in the present application:

Memory—may include non-transitory computer readable media, including volatile memory, such as a random access memory (RAM) module, and non-volatile memory, such as a flash memory unit, a read-only memory (ROM), or a magnetic or optical disk drive, or any other type of memory unit or combination thereof. Memory is configured to store any software programs, operating system, drivers, and the like, that facilitate operation of display system, including software applications, rendering engine, spawning module, and touch module.

Display—may include the display surface or surfaces or display planes of any technically feasible display device or system type, including but not limited to the display surface of a light-emitting diode (LED) display, a digital light (DLP) or other projection displays, a liquid crystal display (LCD), optical light emitting diode display (OLED), laser-phosphor display (LPD) and/or a stereo 3D display all arranged as a single stand alone display, head mounted display or as a single or multi-screen tiled array of displays. Display sizes may range from smaller handheld or head mounted display devices to full wall displays, which may or may not include an array of display devices. The display may include a single camera within a mono display device or a dual camera for a stereo display device. The camera system is particularly envisioned on a portable display device, with a handheld, head mounted, or glasses device. The camera(s) would be located within the display device to peer out in the proximity of what the user of the display device might see; that is, facing the opposite direction of the display surface, Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a Memory.

Viewpoint ("perspective")—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes) of a scene seen from a point (or two points) in space. Thus, viewpoint may refer to the view from a single eye, or 25 may refer to the two points of view from a pair of eyes. A "single viewpoint" may specify that the viewpoint refers to only a single point of view and a "dual viewpoint", "paired viewpoint", or "stereoscopic viewpoint" may specify that the viewpoint refers to two points of view (and not one).

Position—the location or coordinates of an object (either virtual or real). For example, position may include x, y, and z coordinates within a defined space. The position may be relative or absolute, as desired. Position may also include yaw, pitch, and roll information, e.g., when defining the orientation of a viewpoint and/or object at a position within a scene or the scene itself.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Graphical Processing Unit—refers to a component that may reside on a personal computer, workstation, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Projection—refers to the display of a virtual three-dimensional (3D) object, or content, on a two dimensional (2D) rendering presented on a display. A virtual three-dimensional object is an object defined by a three-dimensional model in a three-dimensional virtual coordinate space, which can be projected onto a two-dimensional rendering of a real-world or virtual scene. Thus, a projection may be described as the mathematical function generally in the form of a function applied to objects within a virtual 3D scene to determine the virtual position, size, and orientation of the objects within a 3D scene that is presented on the 3D stereoscopic display from the perspective of a user. A two-dimensional virtual object is an object defined by a two-dimensional model in either a two-dimensional or a three-dimensional virtual coordinate space, which also can be projected on a two-dimensional rendering of a real-world or virtual scene.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Exemplary Physical Displays

In many cases, a single 3D display is not large enough to render both a scene and information about the scene. However, in some cases, the information about the rendered scene does not necessarily have to be rendered on a stereoscopic device, as the information is not three-dimensional. Thus, a monoscopic device, which often has better resolution and/or lower cost, can be used to render the non-three-dimensional data.

This specification describes how a system can integrate two or more displays to render the same scene and/or related data, thereby providing enough screen space to render all required data, without requiring the cost of using solely stereoscopic displays. One or more of the displays can be monoscopic displays, and one or more of the displays can be stereoscopic displays. For example, a first display can be a stereoscopic display that renders a particular three-dimensional virtual scene from a dual viewpoint, and the second display can be a monoscopic displays that renders textual information or 2D rendered objects (or user engagement widgets) about the scene, e.g., information about one or more objects depicted in the scene. The displays can include a rendered connection presentation between objects depicted on respective screens, e.g., a connection line object between two objects depicted on respective screens.

The system can render images on the two or more displays by tracking the position and orientation of the displays in the real-world, e.g., by determining a six-dimensional position vector for each display (x, y, z, yaw, pitch, roll) or by pre-programming six-dimensional position vector for each display or by allowing a default unspecified six-dimensional position vector for each display. The system can then determine the viewpoint of the scene for each viewer to a display, as well as determine the rendered connections to be presented between the multiple displays, according to the respective determined positons and orientations. In some implementations, the system can also track a viewpoint of a user, e.g., a position and orientation of a display device by which the user views the stereoscopic and monoscopic displays, in order to determine the rendered connection presentations between the displays.

The positional relationship between the two displays can be any spatial relationship. Although a system of two displays is discussed below, in general there can be more than two displays, e.g., 3, 10, or 50 displays.

In some implementations, a pointer can be used by a user to interact with the multiple displays. In some cases, the pointer is passive and the position of the pointer is tracked, e.g., by a camera. In this case, the pointer could be a stylus, a finger, or a thimble. In other cases, the pointer can be a pointing device; i.e., the system includes a pointing device equipped with active tracking components, e.g., RF transceivers or IR sources, that aid in with tracking. For example, the pointing device can be a stylus with a tracking component, or a stylus with an attached camera. The system can track the pointer to determine the position/orientation as well as interactions between the pointer and the displays. For example, the pointer can be used by a user to select a virtual object depicted on one of the displays, causing information or another object to be rendered on another one of the displays. As another example, the system can determine a point on one of the displays at which the pointer is pointing using the relating positions and orientations of the displays and pointing device. The system can then render an interaction of the pointer on the display, e.g., a mouse icon or a rendering of a laser pointing, according to the particular type of the display.

Figure 4A:
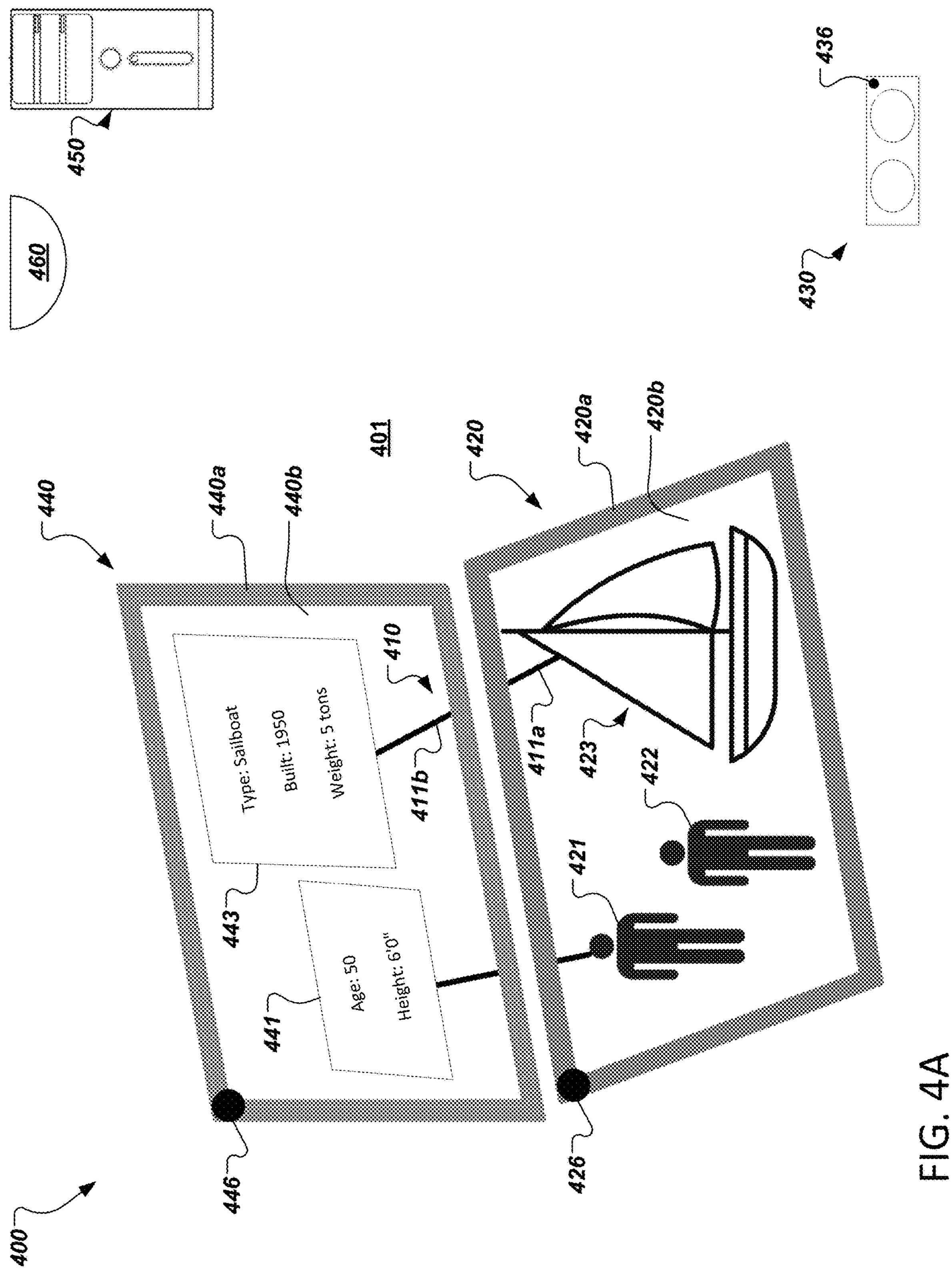
FIGS. 4A, 4B and 4C present an example system with two displays.

FIG. 4A illustrates an exemplary system that may include various embodiments and be configured to use various techniques described below.

FIG. 4A shows an example system 400 that includes a physical stereoscopic display can be a time device 420 and a physical monoscopic display device 440. The stereoscopic display device 420 can operate using time sequential stereo display. In particular, the stereoscopic display device 420 can include a frame 420*a* that surrounds a display screen 420*b* that alternates between displaying different images so that, in conjunction with a viewing device 430, e.g., glasses or goggles with optical switch or with different polarization filters, a stereographic image appears to the user as discussed above. The monoscopic display device 440 can include a frame 440*a* that surrounds a display screen 440*b*.

A processing system 450 determines the images to display on the stereoscopic display 420 and monoscopic display device 440. In particular, how 2D objects, e.g., objects 441 and 443 on display screen 440*b* are rendered can depend on the position and orientation of the monoscopic display device 440 relative to the stereoscopic display 420, in addition to or alternatively upon the position and/or orientation of 3D objects, e.g., objects 421, 422, 423, within the virtual scene displayed by the stereoscopic display 420.

In some implementations, the stereoscopic display device 420 and monoscopic display device 440 can display images that are visually connected by a rendered connection 410. The rendered connection 410 can be determined by the processing system 450 according to the relative positions and/or orientations of the monoscopic display device 440 and the stereoscopic display device 420.

The processing system 450 can be on-site, e.g., in the same room as the environment 401 that includes the devices 420 and 440, or the processing system 450 can be off-site, e.g., in the cloud. As depicted in FIG. 4A, the processing system 450 is external to the display devices. However, the processing system 450 can be distributed with some functionality performed by one or both of the display devices 420 and 440. In other words, each of the devices 420, 440 can include a portion of the processing system 450.

The stereoscopic display device 420 and the monoscopic display device 440 can have tracking components 426 and 446, respectively. Each tracking component can be used to track the location and/or orientation of the respective display device in a common coordinate system. In some implementations, the tracking components 426 and 446 can interact with a tracking base station 460, which is a master tracking device that allows the location and/or orientation of every object in the environment 401 that has a tracker component to be determined. In some implementations, the tracking base station 460 determines the location of each object; in some other implementations, each object determines its own location and/or orientation using the tracker base station 460. In either case, the location and orientation of the display devices can be determined continuously in real-time. Aside from the system knowing the location and/or orientation of each device, the system may have metadata that represents physical characteristics of the tracked device(s). As an example for a display device, the metadata may include outer bezel dimensions, inner active display region, resolution, information, color gamut, sound dynamic, and any other information that may be used by the processing system to better support the system rendering functions to more accurately create the scene renderings for display on the identified devices.

Each tracking component can have multiple sensors, e.g., photosensors, that are separated by some distance. In some implementations, the tracking base station 460 emits a signal, e.g., light or sound having a certain wavelength. Each sensor in the tracking component of a given object can reflect the signal back to the tracking base station 460. The tracking base station 460 can use the multiple returned signals to determine the location and orientation of the given object. For example, the tracking base station can determine the 6 degrees of freedom of the object, e.g., the x-position, y-position, z-position, pitch, yaw, and roll of the object according to a common coordinate system. The tracking base station can repeatedly perform this process in order to determine the location and orientation of the object continuously in real-time, particularly if one or more devices are in movement during usage, for example a user using a portable device.

In some other implementations, the tracking base station 460 can emit a first signal and a second signal concurrently, e.g., if the tracking base station 460 includes two emitters that are physically separated by a distance. Each sensor in the tracking component of a given object can detect the first signal and the second signal at respective detection times, and the tracking component can use the respective detection times of each of the sensors to determine the position and orientation of the given object.

In some other implementations, the tracking base station 460 can include multiple cameras capturing images of the environment 401. The tracking base station 460 can perform object recognition on the captured images, and infer the geometry of the respective tracked objects that are recognized in the captured images.

Whether the position and orientation of each display is determined by the tracking base station 460 or by the display itself, the determined position and orientation can be provided to the processing system 450.

The processing system 450 can maintain a virtual three-dimensional model of the real world environment 401 that includes the display devices 420 and 440. The model can include the measured coordinates, including a location and orientation, of each of the display devices 420 and 440. The display of virtual objects on the display devices 420 and 440 can depend on the location and orientation of the display devices 420 and 440 as well as the location and orientation of the virtual objects within the virtual scene from a mapped three-dimensional model. In particular, the processing system 450 can determine how to render the connection presentation 410 between the presented virtual objects shown on the display devices based on the relative locations and orientations of the devices and the location and orientation of the presented virtual objects within the presented virtual scene. This process is discussed in more detail below in reference to FIG. 6.

The system 400 can also include a viewing device 430 by which a user can view the stereoscopic display device 420. The viewing device 430 can be, for example, polarized glasses or stereo shutter glasses.

In some implementations, the viewing device 430 can include a tracker component 436 that includes one or more sensors, e.g., photosensors. As above, in some implementations, the tracking base station 460 can determine the location of the viewing device 430 by interacting with the tracker component 436. In some other implementations, the viewing device 430 can determine its own location by interacting with the tracking base station 460. In either case, the location and/or orientation of the viewing device 430 can be determined continuously in real-time. In these implementations, the position and orientation of the viewing device 430 in a common coordinate system of the real world environment 401 can be provided to the processing system 450, in addition to the other inputs to the processing system 450 described above.

In some implementations, the processing system 450 can generate i) the monoscopic image that is rendered and to be displayed on the monoscopic device 440, and ii) the stereoscopic image that is rendered and to be displayed on the stereoscopic device 420 by maintaining a three-dimensional virtual environment that includes both i) three-dimensional virtual objects that are depicted on the stereoscopic device 420 and ii) two-dimensional virtual objects that are depicted on the monoscopic device 440. That is, the processing system 450 can render the monoscopic image and the stereoscopic image from a single maintained three-dimensional virtual environment containing both three-dimensional and two-dimensional virtual objects. The three-dimensional virtual environment can also include only three-dimensional virtual objects, which the processing system 450 can process in order to render two-dimensional representations of the virtual objects for display on the monoscopic device 440. Rendering of the image for the monoscopic display can depend on i) the position and orientation of the second display rendering relative to the first display rendering, and/or ii) the position and/or orientation of 3D objects within the virtual scene as well as may be referenced to the user's perspective.

In some other implementations, the processing system 450 can generate i) the monoscopic image that is to be rendered and displayed on the monoscopic device 440, and ii) the stereoscopic dual-view image that is to be rendered and displayed on the stereoscopic device 420 by maintaining two separate virtual environments. The first virtual environment can be a three-dimensional virtual environment that includes three-dimensional virtual objects, and the second virtual environment can be a two-dimensional virtual environment that includes two-dimensional virtual objects. That is, the processing system 450 can render the monoscopic image from the two-dimensional virtual environment and the stereoscopic image from the three-dimensional virtual environment.

In some implementations example, the processing system 450 can maintain synchronization between the respective states of the two virtual environments using a message passing system; that is, a subsystem maintaining the virtual environment of the stereoscopic display 420 can send messages to a subsystem maintaining the virtual environment of the monoscopic display 440, and vice versa. In some implementations, the respective subsystems execute on the devices 440 and 420 themselves; that is, the stereoscopic display 420 sends messages to the monoscopic display, and vice versa. As a particular example, the stereoscopic device 420 might receive a user input to change state; in response, the stereoscopic device 420 can send a message to the monoscopic deice 440 to similarly change state. Examples of state changes are discussed in more detail below in reference to FIG. 4C.

In some other implementations, the processing system can receive the stereoscopic image to be displayed on the stereoscopic device 420 from a different system, and generate the monoscopic image to be displayed on the monoscopic device 440 from the received stereoscopic image. That is, the system can maintain a two-dimensional virtual environment containing two-dimensional virtual objects, and can render the monoscopic image using the maintained two-dimensional virtual environment, and the relative positions and orientations of the display devices.

In some other implementations, the processing system 450 can receive both i) the monoscopic rendered image to be displayed on the monoscopic device 440 and ii) the stereoscopic rendered dual-view image to be displayed on the stereoscopic device 420 from a different system. The processing system 450 can then generate an update to i) the monoscopic image, ii) the stereoscopic image, or iii) both. The processing system 450 can determine the update according to the relative positions and orientations of the display devices.

As a particular example, the processing system 450 can obtain data indicating the position and orientation of the user's eyepoints 432*a*, 432*b* within the physical environment 401. For example, the position and orientation of the eyepoints can be calculated from the position of the tracking device 436 on the viewing device 430. Similarly, the processing system 450 can obtain data indicating the position and orientation of the display screens 420*b*, 440*b*. For example, the position and orientation of the display screens 420*b*, 440*b* can be calculated from the positions of the tracking devices 426, 436. However, in some implementations, a tracking system could be configured to simply provide a relative position and orientation between the eyepoints and the display screens. In addition, in some situations the position and orientation data can be predetermined, e.g., one or more of the components is in a fixed position.

Figure 4B:
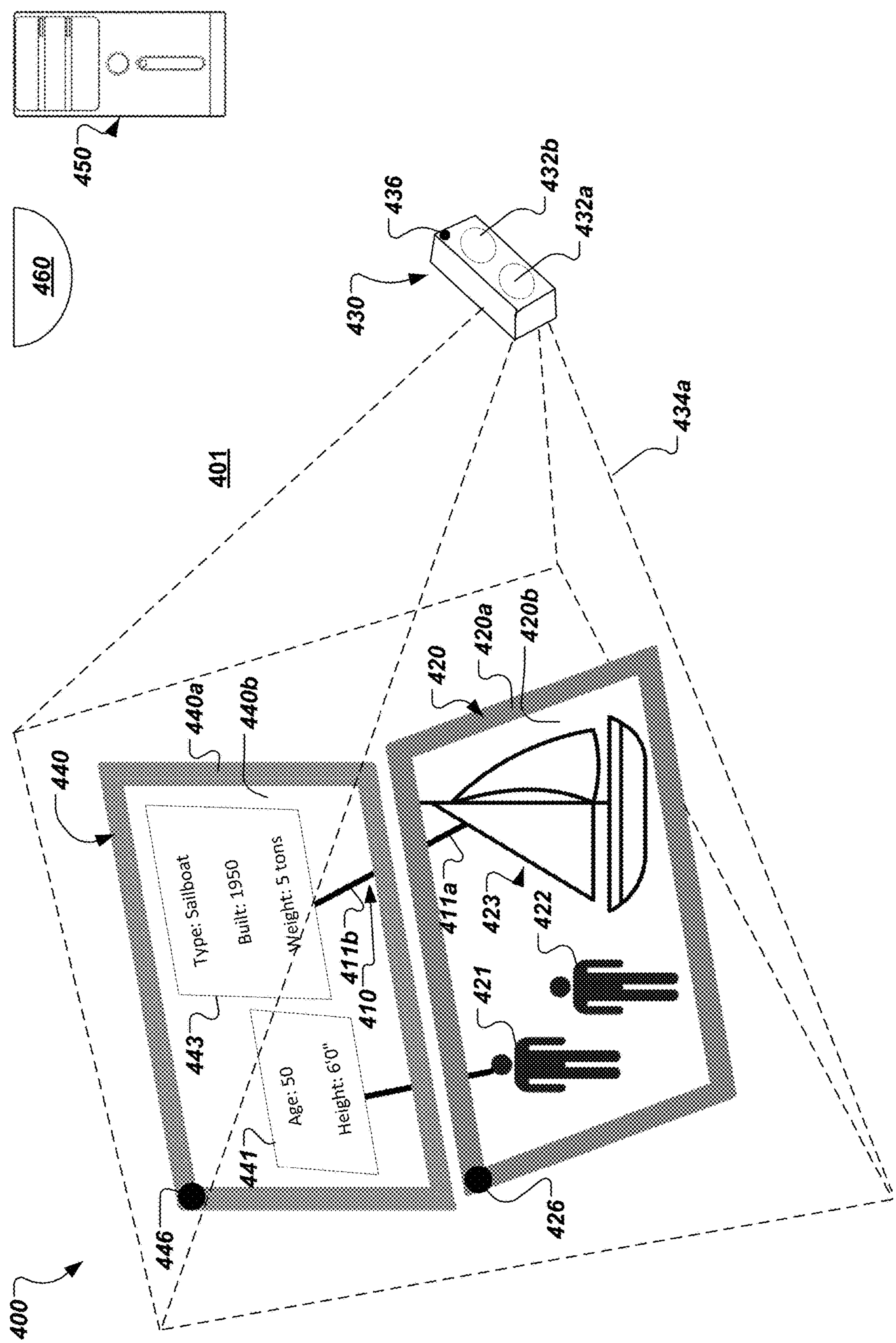

The processing system can also determine the position and orientation within the model space of two frustums 434 associated with the two eyepoints 432*a*, 432*b* (only a single frustrum 434 from the left eyepoint 432*a* is illustrated in FIG. 4B for clarity of the drawing, but the other frustrum would be similarly positioned with respect to the right eyepoint 432*b*). For example, the position and orientation of two frustums 434 can be calculated by mapping the position and orientation of the eyepoints 432*a*, 432*b* to mapped positions and orientations in the model space, and the position and orientations of the frustums within the model space can be calculated from the mapped eyepoint positions and orientations, e.g., each frustum can be a volumes in the model space having a predetermined position and orientation relative to the associated mapped eyepoint position and orientation.

In addition, the processing system 450 can maintain a model of the virtual environment with the virtual objects, e.g., persons 421 and 422 and boat 423, that are to be viewed using the stereoscopic first display 420. The processing system 450 can treat the virtual environment as fixed relative to the real environment (as determined by the system from the tracking data), or as fixed relative to the position and/or orientation of the stereoscopic first display 420.

The processing system can also determine the position and orientation within the model space of a display plane (or render plane), e.g., by mapping the position and orientation of the display screen 420*b* as determined from the tracking device 426 to a mapped position and orientation in the model space. For each eyepoint, the system can render the virtual objects 421-423 from the virtual scene, e.g., the person or the boat, by projecting those virtual objects 421-423 that within the frustum onto the portion of the display plane that intersects the frustum. This provides the two images to be displayed by the time sequential stereo display 420, which when viewed through the viewing device 430 will appear as a stereoscopic image.

For the monoscopic second display 440, positions or other attributes, e.g., size, of the two-dimensional rendered objects within a display area can depend on the position and orientation of the monoscopic display screen 440 relative to the stereoscopic display screen 440, and/or the positions and/or orientations of one or more virtual objects, e.g., objects 421-423, in the model space. For example, as the monoscopic display screen is moved relative to the stereoscopic display screen, the two-dimensional objects can be re-rendered with revised positions or shapes.

In particular, the system can maintain a mapping that associates positions in the three-dimensional virtual scene with positions in the display area. For example, for a virtual object 423 e.g., the boat 423, displayed near the right side of the virtual environment, the associated two-dimensional object 443, e.g., the description of the boat 443, can be displayed near the right side of the virtual environment, whereas a virtual object 421, e.g., the person 421, displayed near the left side of the display screen 420*b*, the associated two-dimensional object 441, e.g., the description of the person 441, can be displayed near the left side of the display screen 440*b*.

The processing system 450 can render the monoscopic image so that the monoscopic image reactive to the three-dimensional virtual objects depicted on the stereoscopic image. For example, the position and/or orientation of one or more two-dimensional virtual objects depicted on the monoscopic display can depend on the position and/or orientation of one or more three-dimensional virtual objects depicted on the stereoscopic display. In general, a change in position in one object, e.g., the virtual 3D object 423, can result in a change in position of the associated object, e.g., the 2D object 443. This can be accomplished by simply recalculating appropriate positions for the objects when receiving user input moving an object. As a particular example, if one of the human objects depicted on the stereoscopic display 420 moves to the opposite side of the boat, as depicted in FIG. 4A, then the processing system 450 can render the text box associated with the human so that the text box associated with the human is on the opposite side of the text box associated with the boat.

As another example, a color, brightness or other quality of one or more two-dimensional virtual objects depicted on the monoscopic image can depend on one or more three-dimensional virtual objects depicted on the stereoscopic image. As a particular example, if one of the human objects depicted on the stereoscopic display 420 grows smaller, as if moving away from the user from the perspective of the user, then the processing system 450 can render the text box associated with the human so that it fades away, i.e., the transparency of the text box increases, or the text gets smaller, i.e., the font size decreases.

In addition, as depicted in FIG. 4A, the processing system 450 can render a connection 410 between a two-dimensional virtual object depicted on the monoscopic display and a three-dimensional virtual object depicted on the stereoscopic display. As another example, For rendering a connection object 410 between a related 3D and 2D rendered objects, the processing system can use the determined positions and orientations of the two display devices to determine the rendered connection object 410. In particular, the processing system 450 can determine a monoscopic portion of the rendered connection object 410 that will be displayed on the monoscopic display device 440 and a stereoscopic portion of the rendered connection object 410 that will be displayed on the stereoscopic display device 440. The monoscopic portion of the rendered connection object 410 can appear, from the point of view of a user, as if the stereoscopic portion of the rendered connection object 410 has been dual-view projected rendered onto the monoscopic display device 440.

In these implementations, the processing system can use the position and orientation of the viewing device 430 to determine how the connection object should be rendered in order to appear seamless to the user using the viewing device 430. For example, the connection might be rendered differently if the user is viewing the two displays 420 and 440 from directly above the two displays 420 and 440, as opposed to viewing the two displays at a sharp angle to the left or right of the two displays 420 and 440.

To generate the rendered connection, in the model the system can generate a virtual connection object 410, e.g., a line, that extends through the virtual environment between the virtual object 423 and the two-dimensional object 443. To render the connection object 410, the connection object can be divided into two portions: a first portion 411*a* displayed by the stereoscopic first device 420 and a second portion 411*b* displayed on the monoscopic second device 440. The first portion 411*a* can be rendered using techniques described above for rendering of virtual three dimensional objects and is thus displayed as part of the virtual scene. The second portion 411*b* is rendered by projecting the portion of the connection object 410 onto the plane of the virtual screen object; this determines the two-dimensional image to be displayed by the second display 440. As a result, the second portion 411*b* can be rendered to appear "aligned" with the first portion 411*a*, e.g., that the first portion 411*a* appears as if the second portion 411*b* extended onto the second display.

In some implementations, the processing system 450 can render an object moving between the monoscopic display device 440 and the stereoscopic display device 420, and vice versa, in a way that appears continuous to the user. For example, the processing system 450 can receive a user command to move an object between the two displays, e.g., by receiving a user command from a pointing device. The system 450 can render the transition between the two screens so that the transition renderings appear consistent, functionally, and visually smooth to the user. For example, the processing system 450 can animate a transition between a three-dimensional object and a two-dimensional object. This is accomplished by mapping the two models through one of many means. One method involves a database that keeps a spatial record between the 3D model and 2D model and the user information of the position, orientation and/or direction of a pointing device. With the 2D and the 3D models mapped in conjunction to the physical display devices being further mapped to the 2D and 3D models, the tracked location of the pointing device communicates with the database in conjunction with the model spatial maps and permits the processing system to know to imply a pointer object to be rendered in connection to the tracked position of the pointing device for rendering on the 2D or 3D display device, where the rendering may be dual view projection on the 3d display device and a mon-view projection on the 2D display device and each rendering may be distinct for each of the 2D and 3D target displays.

Figure 4C:
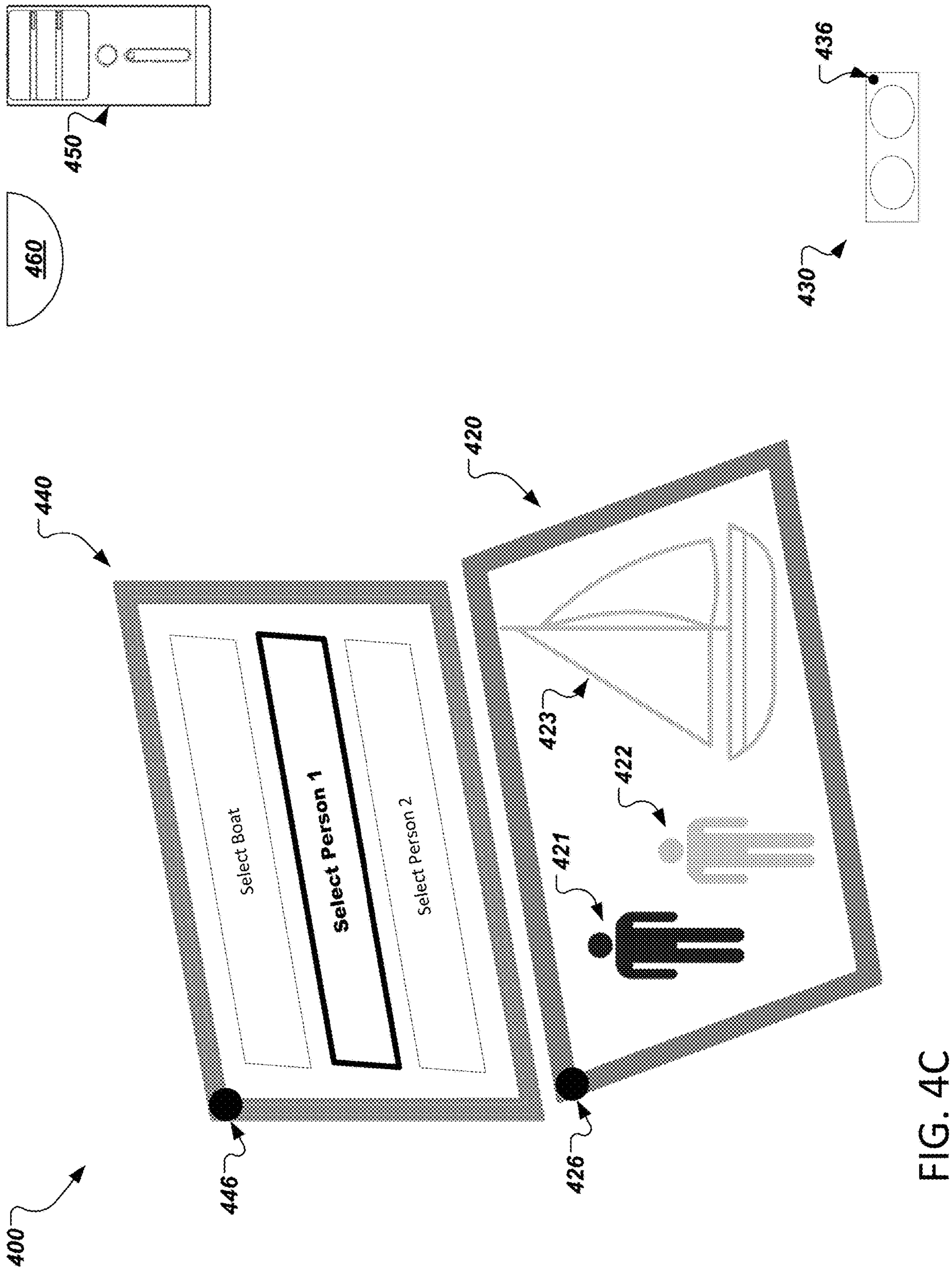

FIG. 4C shows the same example system 400 shown in FIG. 4A. In the example shown in FIG. 4C, a user interaction with the monoscopic display device 440 causes the stereoscopic image that is rendered on the stereoscopic display device 420 to change. Note that in some other implementations, a user interaction with the stereoscopic display device 420 can cause the monoscopic image that is rendered on the monoscopic display device 440 to change.

The monoscopic display device can receive a user input, e.g., a tap, mouse click, or voice command in connection with the user positioned input device to a location (and/or orientation) to the virtual objects as presented on one or the other or both display devices. The user input can be provided to the processing system 450, which can process the user input to determine a how the user input affects the stereoscopic image rendered on the stereoscopic display device 420. As depicted in FIG. 4C, the processing system 450 can determine that the user selected the "Select Person 1" option coincident with the "Select Person 1" option object, and render the stereoscopic image displayed on the stereoscopic display device 420 so that the first person object is emphasized, while the second person object and the boat object are de-emphasized. In some implementations, the processing system 450 can fully render the stereoscopic image and send the stereoscopic image for display on the stereoscopic display device 420. In some other implementations, the processing system 450 can receive i) an initial stereoscopic image rendered by an external system and ii) the user input, and process the initial stereoscopic image to generate a final stereoscopic image that reflects the user input.

Figure 5A:
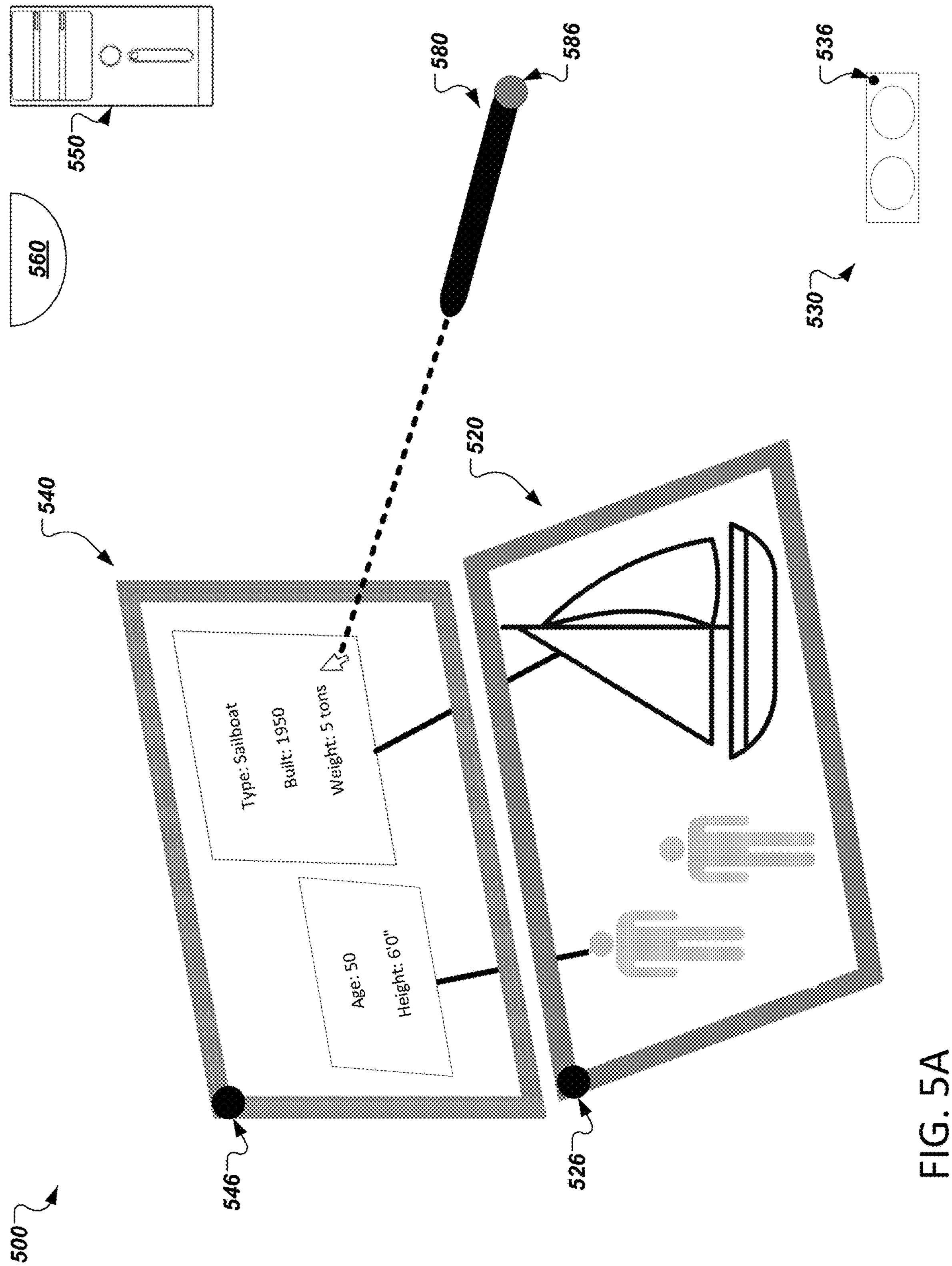
FIGS. 5A and 5B present an example system with two displays and a pointing device.

FIG. 5A shows an example environment 500 that includes a stereoscopic display device 520, a monoscopic display device 540, and a pointing device 580. The pointing device 580 can be used by a user to interact with both the display devices 520 and 540. In particular, which display device 520, 540 the pointing device 580 interacts with can depend on the system tracked and determined positional context of the pointing device 580 relative to the display devices 520 and 540. The pointing device 580 can be, for example, a stylus, a stylus with an attached camera, a finger, or a tracked thimble.

Using the respective system tracked and determined locations and orientations of the pointing device 580 and the display devices 520 and 540, the processing system 550 can determine with which device 520 or 540 the pointing device 580 is interacting. For example, the processing system 550 can determine the pointing device 580 is interacting with whichever device 520 or 540 is closer to the pointing device 580, regardless of the orientation of the pointing device 580.

As another example, the processing system 550 can determine which device 520 or 540 the pointing device 580 is pointing at. That is, the processing system 550 can determine a point on one of the display devices 520 and 540 at which the pointing device 580 is pointing or rather the place in the mapped space at which the pointing device 580 is pointing. For example, the processing system 550 can project a virtual or imaginary ray from the end of the pointing device 580 in the direction of the orientation of the pointing device 580, until the ray intersects a target, which may be one of the display devices 520 and 540 or a location in the mapped virtual space or an object in the mapped virtual space or an object; the processing system 550 can determine the point at which the ray intersect the particular target to be the point at which the pointing device 580 is pointing.

The processing system can generate an update to the image rendered on the particular display device at which the pointing device 580 target is identified (in this case, an object as rendered and displayed on the monoscopic display device 540). For example, the processing system can render a mouse icon at the point on the monoscopic display device 540, to signal to the user where the pointing device 580 is pointing. In some implementations, the processing system 550 renders the entire monoscopic image and provides the monoscopic image to the monoscopic display device 540. In some other implementations, the processing system 550 receives an initial monoscopic image from an external system, and processes the initial monoscopic image, e.g., by adding a mouse icon, to generate a final monoscopic image.

The processing system can also generate an update to the other display device in the environment 500 (in this case, the stereoscopic display device 520) in response to user input from the pointing device 580. For example, the user can use the pointing device 580 to select an icon or option as rendered on the particular display device; for example, the user can select an option by pointing at the option for a predetermined amount of time or by clicking a button, which may be located on the pointing device 580. The processing system can receive the selection of the icon or option, and determine an update to the stereoscopic image rendered on the stereoscopic display device 520. For example, the user can select the "Sailboat" option object on the monoscopic display device 540, and the processing system 550 can generate a stereoscopic image for display on the stereoscopic display device 520 that emphasizes the sailboat object and de-emphasizes the two human objects, as depicted in FIG. 5A. As before, in some implementations, the processing system 550 renders the entire stereoscopic image; in some other implementations, the processing system 550 receives an initial stereoscopic image from an external system, and processes the initial stereoscopic image to generate a final stereoscopic image.

Figure 5B:
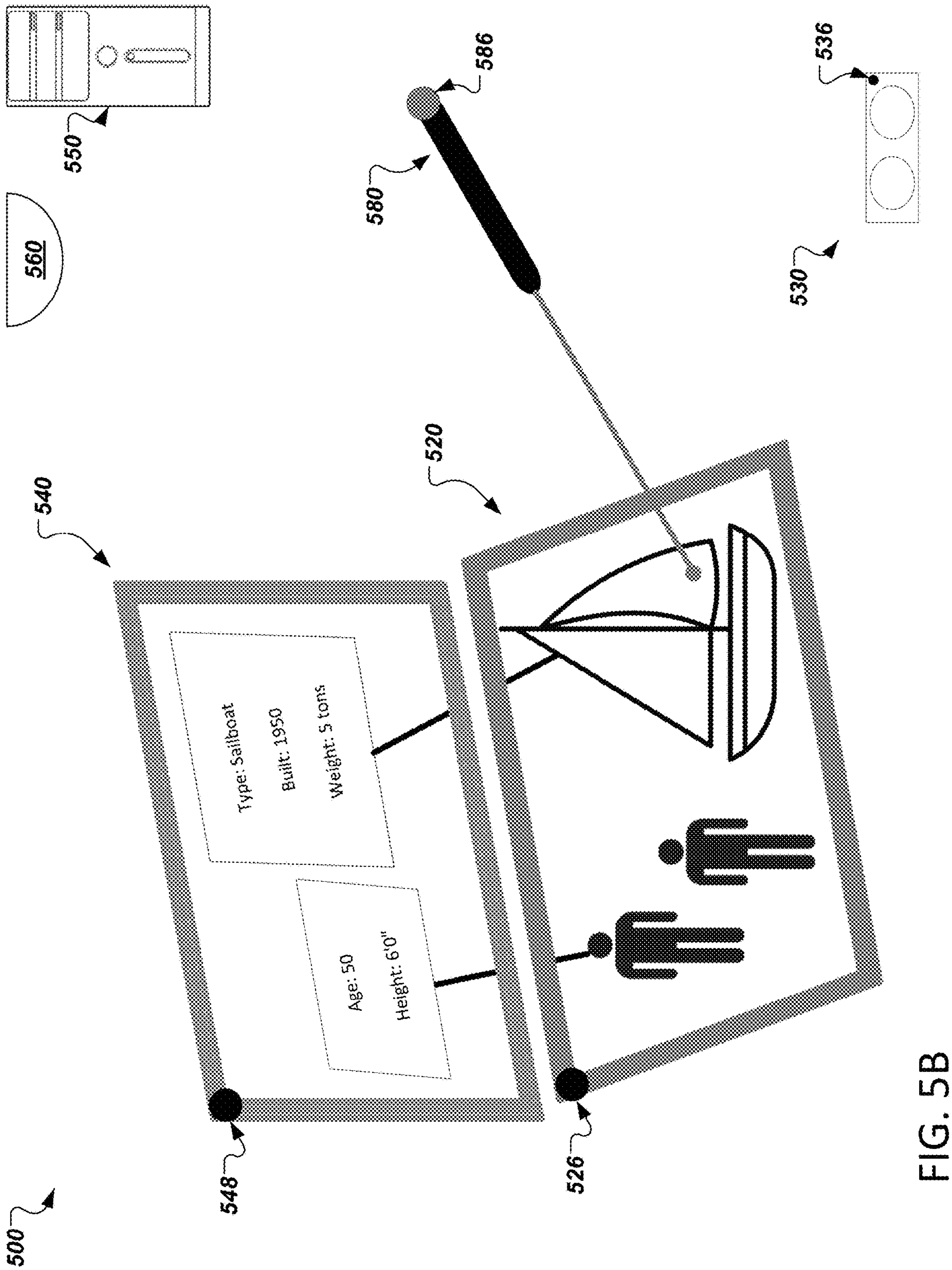

FIG. 5B shows the same example environment 500 shown in FIG. 5A. In the example shown in FIG. 5B, the pointing device 580 is moved to point at the stereoscopic display device 520.

The processing system 550 can render the transition between the monoscopic display device 540 and the stereoscopic display device 520 so that the transition renderings appear consistent, functionally, and visually smooth to the user. That is, the processing system 550 can determine i) the interaction between the pointing device 580 and the monoscopic display device 540, and ii) the interaction between the pointing device 580 and the stereoscopic display device 520, in a consistent manner, so that it appears to the user that the pointing device 580 is interacting with a single continuous environment. For example, when pointing device 580 first crosses from a first point on the monoscopic display device 540 to a second point on the stereoscopic display device 520, the processing system 550 can ensure that the first point and the second point are visually congruent to each other in the environment 500, so that the transition appears continuous to the user.

As another example, the processing system 500 can process the objects depicted in the stereoscopic image displayed on the stereoscopic display device 520 as if the objects were in the environment 500. That is, if an object depicted on the stereoscopic image is positioned, from the point of view of the user in the three-dimensional environment 500, between the pointing device 580 and the monoscopic device 540, then the processing system can determine that the pointing device 580 is pointing at the object, instead of at the monoscopic display device 540. In other words, if the pointing device would be determined to be pointing at the monoscopic display device 540 if both displays were off, but an object appears, from the point of view of the user, to be coming out of the stereoscopic display device 520 into positive space and intersecting the ray between the pointing device 580 and the monoscopic display device 540, then the processing system 550 can determine that the pointing device is pointing at the object, and process the stereoscopic image to update the rendering accordingly.

In some implementations, the rendering of the point at which the pointing device 580 is pointing can depend on whether the display device is a monoscopic or stereoscopic device. In the example depicted in FIGS. 5A and 5B, the rendering is a mouse icon if the display device is monoscopic and a laser pointer if the device is stereoscopic.

Exemplary Processes

Figure 6:
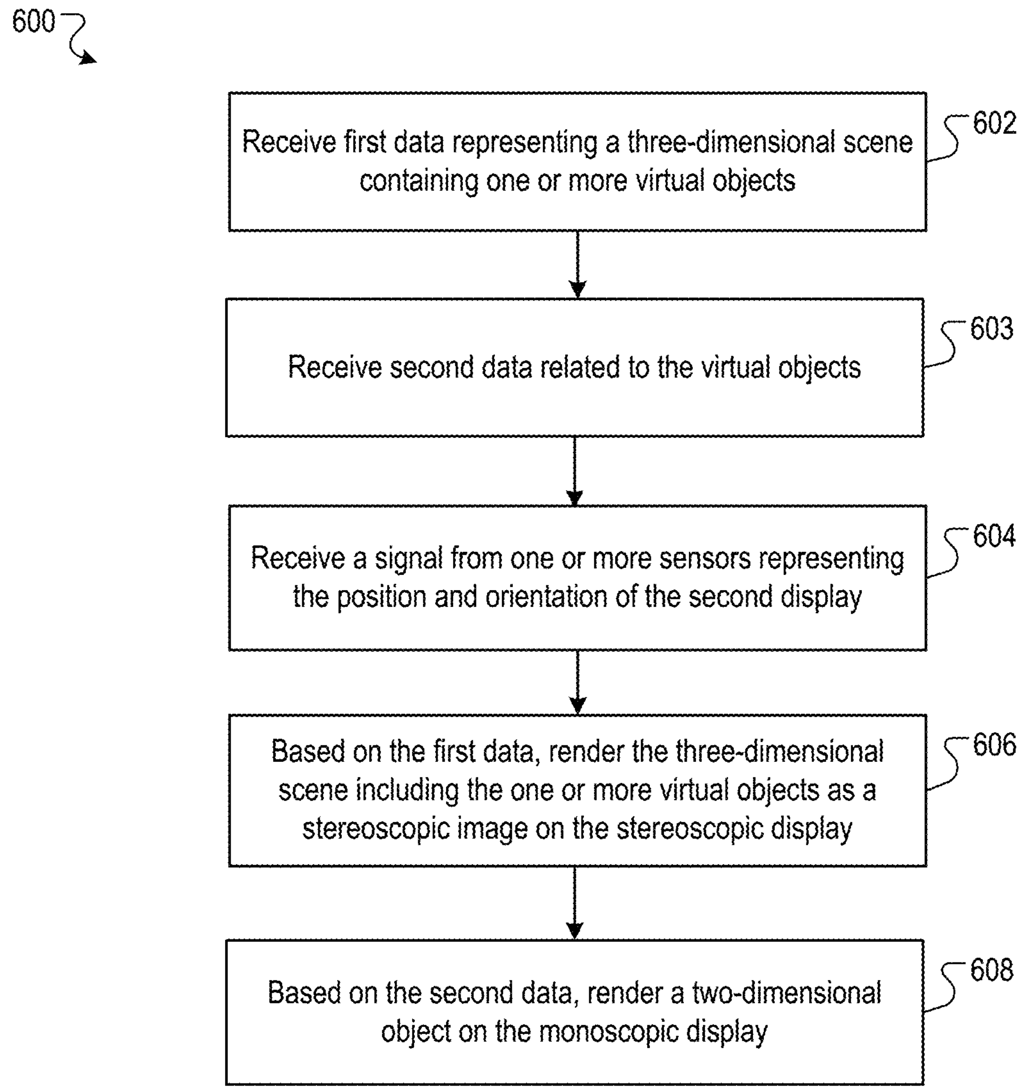
FIG. 6 is a flow diagram of an example process for rendering images on two displays.

FIG. 6 is a flow diagram of an example process 600 for rendering images on two displays. The first display can be a stereoscopic display, and the second display can be a monoscopic display.

For convenience, the process 600 will be described as being performed by a system of one or more computers located in one or more locations. For example, a processing system, e.g., the processing system 450 of FIGS. 4A-4C, appropriately programmed in accordance with this specification, can perform the process 600. As another example, a stereoscopic or monoscopic device, e.g., the devices 420 and 440 of FIGS. 4A-4C, appropriately programmed in accordance with this specification, can perform the process 600. In some implementations, a subset of steps of the process 600 can be performed by a processing system that is separate from a stereoscopic or monoscopic device, and the remaining steps of the process 600 can be performed on-device by the respective stereoscopic or monoscopic device.

The system receives first data representing a three-dimensional scene that includes one or more virtual three-dimensional objects (step 602).

The system receives second data related to the one or more virtual three-dimensional objects (step 603).

The system receives a signal representing the position and orientation of the second display relative to the first display (step 604). That is, the system can include one or more sensors that track the position and orientation of the second display relative to the first display. The position and orientation of the second display can be in a common coordinate system of the system.

The system renders, based on the first data, the three-dimensional scene as a stereoscopic image on the stereoscopic first display (step 606). The three-dimensional scene can include the one or more virtual three-dimensional objects.

The system renders, based on the second data, a two-dimensional object on the monoscopic second display (step 608). The system can render the two-dimensional object according to the position and orientation of the second display relative to the first display. For example, the system can determine a position on the second display on which to display the two-dimensional object according to the relation position and orientation of the second display. As another example, the system can determine a position on the second display on which to display the two-dimensional object according to a position and/or orientation of one or more virtual three-dimensional object within the stereoscopic image. As another example, the system can determine a modification of the two-dimensional object based on the relative position and/or orientation of the second display; as a particular example, the system can add color, bold, shadow, or highlight the two-dimensional object.

As another example, the system can render a connection between the two-dimensional objet and one or more of the virtual three-dimensional objects displayed on the first display. As another example, the system can receive a selection of one or more virtual three-dimensional objects and render the two-dimensional object according to the selection.

The two-dimensional object can be a text box, where the second data is text. The two-dimensional object can also be a two-dimensional image, where the second data is a corresponding monoscopic image.

Figure 7:
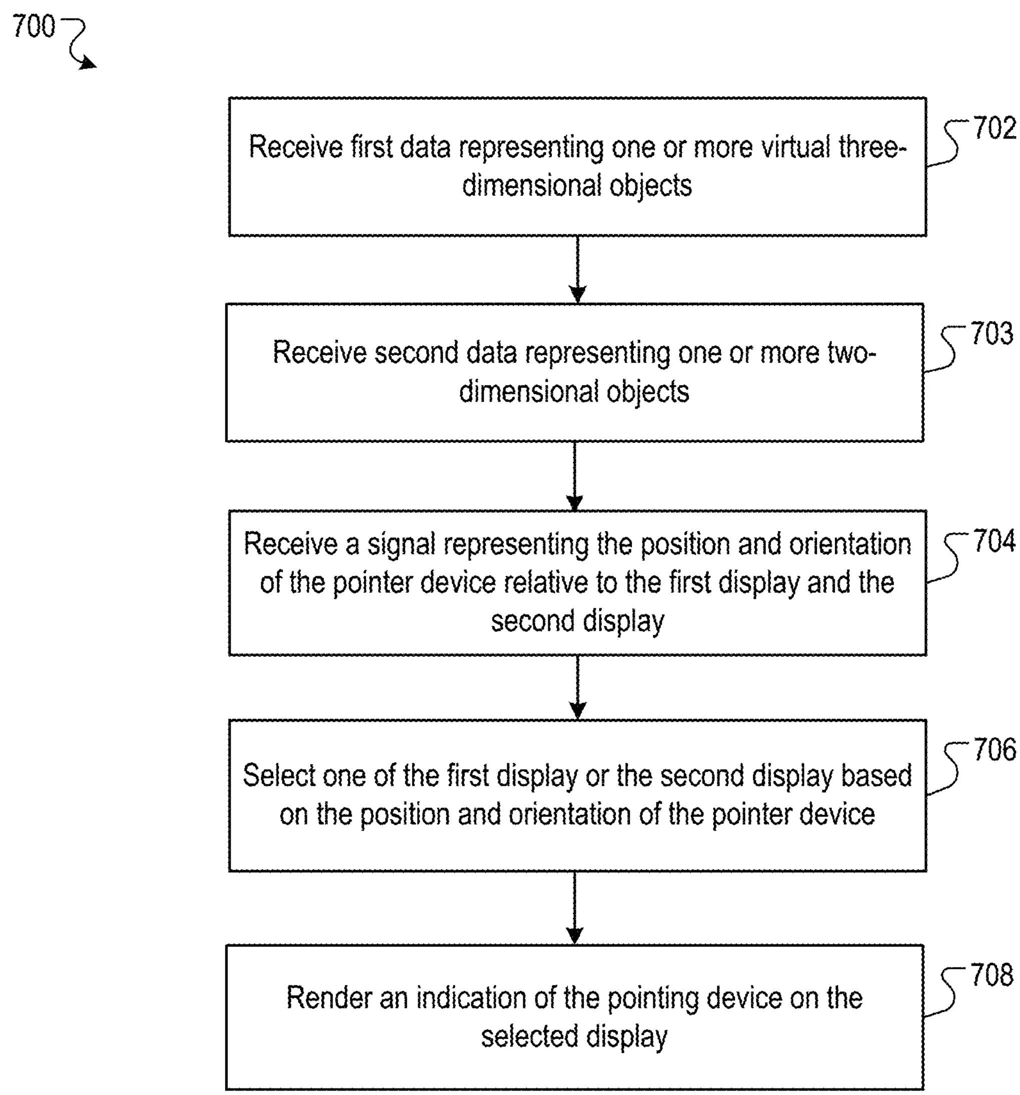
FIG. 7 is a flow diagram of an example process for rendering an interaction of a pointing device with display devices.

FIG. 7 is a flow diagram of an example process 700 for rendering an interaction between a pointer and two displays. The first display can be a stereoscopic display, and the second display can be a monoscopic display. In some cases, the pointer is passive, e.g., the pointer could be a stylus, a finger, or a thimble. In other cases, the pointer can be a pointing device, e.g., a stylus with a tracking component, or a stylus with an attached camera.

For convenience, the process 700 will be described as being performed by a system of one or more computers located in one or more locations. For example, a processing system, e.g., the processing system 550 of FIGS. 5A and 5B, appropriately programmed in accordance with this specification, can perform the process 700. As another example, a stereoscopic or monoscopic device, e.g., the devices 520 and 540 of FIGS. 5A and 5B, appropriately programmed in accordance with this specification, can perform the process 700. In some implementations, a subset of steps of the process 700 can be performed by a processing system that is separate from a stereoscopic or monoscopic device, and the remaining steps of the process 700 can be performed on-device by the respective stereoscopic or monoscopic device.

The system receives first data representing one or more virtual three-dimensional objects (step 702).

The system receives second data representing one or more two-dimensional objects (step 703).

The system receives a signal representing the position and orientation of the pointer relative to the first display and the second display (step 704). That is, the system can include one or more sensors that track the position and orientation of the pointer relative to the second display and the first display. The position and orientation of the pointer can be in a common coordinate system of the system.

The system selects one of the first display or the second display based on the position and orientation of the pointer (step 706). For example, the system can determine a position of the pointer relative to the virtual position of one or more of the three-dimensional objects. As a particular example, the system can determine whether the pointer is closer to the monoscopic second display or to the virtual position of the one or more three-dimensional objects. As another example, the system can select the first display or the second display by determine an intersection of a line projected from the pointer that depends on an orientation of the pointer with one of the displays.

The system renders an indication of the pointer on the selected display (step 708). For example, the system can render a ray emerging from the pointer towards the first displays. As another example, the system can render a pointer icon at a location within the virtual scene displayed on the stereoscopic first display corresponding to a location of the pointer. As another example, the system can render a pointer icon at a location on the monoscopic second display at a location on the second display pointed to by the pointer.

It should be noted that the above-described embodiments are exemplary only, and are not intended to limit the invention to any particular form, function, or appearance. Moreover, in further embodiments, any of the above features may be used in any combinations desired. In other words, any features disclosed above with respect to one method or system may be incorporated or implemented in embodiments of any of the other methods or systems.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A hybrid display system, comprising:
a stereoscopic first display;
a monoscopic second display; and
one or more computers configured to perform operations including
receiving first data representing a 3D scene including a virtual 3D object,
receiving second data related to the virtual 3D object,
obtaining third data representing a position and/or orientation of the monoscopic second display relative to a position and/or orientation of the stereoscopic first display,
based on the first data, rendering the 3D scene including the virtual 3D object as a stereoscopic image on the stereoscopic first display, and
based on the second data, rendering a 2D object on the monoscopic second display with the rendering varying based on the position and/or orientation of the monoscopic second display relative to the position and/or orientation of the stereoscopic first display provided by the third data, wherein rendering the 2D object includes determining a modification of the 2D object based on the position and/or orientation of the monoscopic second display relative to the position and/or orientation of the stereoscopic first display.

2. The system of claim 1, wherein:
the system further comprises one or more sensors configured to track one or more of (i) the position and/or orientation of the monoscopic second display or (ii) the position and/or orientation of the stereoscopic first display; and
obtaining the third data comprises receiving a signal from the one or more sensors representing one or more of (i) the position and/or orientation of the monoscopic second display or (ii) the position and/or orientation of the stereoscopic first display.

3. The system of claim 1, wherein rendering the 2D object further includes determining a position on the monoscopic second display to display the 2D object based on one or more of:
the position and/or orientation of the monoscopic second display relative to the position and/or orientation of the stereoscopic first display, or
a position and/or orientation of the virtual 3D object within the stereoscopic image on the stereoscopic first display.

4. The system of claim 1, wherein determining a modification of the 2D object includes adding one or more of color, bolding, shadowing, or highlighting.

5. The system of claim 1, wherein rendering the 2D object further includes rendering a connection object connecting the virtual 3D object displayed on the stereoscopic first display and the 2D object displayed on the monoscopic second display, where the connection object rendering includes (i) a dual view projection rendering on the stereoscopic first display and (ii) a mono view projection rendering on the monoscopic second display.

6. The system of claim 1, wherein:
the second data includes text and the 2D object includes a text box, and/or
the second data includes a monoscopic rendered image and the 2D object includes a 2D rendered image.

7. A hybrid display system, comprising:
a stereoscopic first display;
a monoscopic second display; and
one or more computers configured to perform operations including
receiving first data representing a 3D scene including a virtual 3D object,
receiving second data related to the virtual 3D object,
based on the first data, rendering the 3D scene including the virtual 3D object as a stereoscopic image on the stereoscopic first display, and
based on the second data, rendering a 2D object on the monoscopic second display with the rendering of the 2D object varying based on a position and/or orientation of the virtual 3D object within the stereoscopic image on the stereoscopic first display, wherein rendering the 2D object includes determining a modification of the 2D object based on the position and/or orientation of the virtual 3D object within the stereoscopic image on the stereoscopic first display.

8. The system of claim 7, wherein rendering the 2D object further includes determining a position on the monoscopic second display to display the 2D object based on one or more of:
a position and/or orientation of the monoscopic second display relative to a position and/or orientation of the stereoscopic first display; or
the position and/or orientation of the virtual 3D object within the stereoscopic image on the stereoscopic first display.

9. The system of claim 7, wherein determining a modification of the 2D object includes adding one or more of color, bolding, shadowing, or highlighting.

10. The system of claim 7, wherein rendering the 2D object further includes rendering a connection object connecting the virtual 3D object displayed on the stereoscopic first display and the 2D object displayed on the monoscopic second display, where the connecting object rendering includes (i) a dual view projection rendering on the stereoscopic first display and (ii) a mono view projection rendering on the monoscopic second display.

11. The system of claim 7, wherein:
the second data includes text and the 2D object includes a text box, and/or
the second data includes a monoscopic rendered image and the 2D object includes a 2D rendered image.

12. The system of claim 7, wherein rendering the 2D object includes rendering a connection object connecting the virtual 3D object displayed on the stereoscopic first display and the 2D object displayed on the monoscopic second display, where the connection object rendering includes (i)

a dual view projection rendering on the stereoscopic first display and (ii) a mono view projection rendering on the monoscopic second display.

13. A hybrid display system, comprising:

a stereoscopic first display;

a monoscopic second display; and one or more computers configured to perform operations including receiving first data representing a 3D scene including a virtual 3D object, receiving second data related to the virtual 3D object, obtaining third data representing a position and/or orientation of the monoscopic second display relative to a position and/or orientation of the stereoscopic first display, based on the first data, rendering the 3D scene including the virtual 3D object as a stereoscopic image on the stereoscopic first display, receiving a selection of the virtual 3D object, and in response to receiving the selection of the virtual 3D object, rendering, based on the second data, a 2D object on the monoscopic second display with the rendering varying based on the position and/or orientation of the monoscopic second display relative to the position and/or orientation of the stereoscopic first display provided by the third data.

14. The system of claim 13, wherein:

the system further comprises one or more sensors configured to track one or more of (i) the position and/or orientation of the monoscopic second display or (ii) the position and/or orientation of the stereoscopic first display; and obtaining the third data comprises receiving a signal from the one or more sensors representing one or more of (i) the position and/or orientation of the monoscopic second display or (ii) the position and/or orientation of the stereoscopic first display.

15. The system of claim 13, wherein rendering the 2D object includes determining a position on the monoscopic second display to display the 2D object based on one or more of:

the position and/or orientation of the monoscopic second display relative to the position and/or orientation of the stereoscopic first display; or a position and/or orientation of the virtual 3D object within the stereoscopic image on the stereoscopic first display.

16. The system of claim 13, wherein:

the second data includes text and the 2D object includes a text box, and/or the second data includes a monoscopic rendered image and the 2D object includes a 2D rendered image.

17. A hybrid display system, comprising:

a stereoscopic first display;

a monoscopic second display; and one or more computers configured to perform operations including receiving first data representing a 3D scene including a virtual 3D object, receiving second data related to the virtual 3D object, based on the first data, rendering the 3D scene including the virtual 3D object as a stereoscopic image on the stereoscopic first display, receiving a selection of the virtual 3D object, and in response to receiving the selection of the virtual 3D object, rendering, based on the second data, a 2D object on the monoscopic second display with the rendering of the 2D object varying based on a position and/or orientation of the virtual 3D object within the stereoscopic image on the stereoscopic first display.

18. The system of claim 17, wherein rendering the 2D object includes determining a position on the monoscopic second display to display the 2D object based on one or more of:

a position and/or orientation of the monoscopic second display relative to a position and/or orientation of the stereoscopic first display; or the position and/or orientation of the virtual 3D object within the stereoscopic image on the stereoscopic first display.

19. The system of claim 17, wherein rendering the 2D object includes rendering a connection object connecting the virtual 3D object displayed on the stereoscopic first display and the 2D object displayed on the monoscopic second display, where the connecting object rendering includes (i) a dual view projection rendering on the stereoscopic first display and (ii) a mono view projection rendering on the monoscopic second display.

20. The system of claim 17, wherein:

the second data includes text and the 2D object includes a text box, and/or the second data includes a monoscopic rendered image and the 2D object includes a 2D rendered image.

* * * * *